United States Patent
Goodman et al.

(10) Patent No.: US 7,346,911 B2
(45) Date of Patent: Mar. 18, 2008

(54) METHOD, SYSTEM, AND PROGRAM FOR COMMUNICATION AMONG NODES IN A SYSTEM

(75) Inventors: Brian Gerard Goodman, Tuscon, AZ (US); Ronald Faye Hill, Jr., Tucson, AZ (US); Leonard George Jesionowski, Tucson, AZ (US); Michael Philip McIntosh, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1134 days.

(21) Appl. No.: 09/755,405

(22) Filed: Jan. 5, 2001

(65) Prior Publication Data

US 2002/0097720 A1 Jul. 25, 2002

(51) Int. Cl.
G06F 15/177 (2006.01)
G06F 9/54 (2006.01)
G06F 7/00 (2006.01)

(52) U.S. Cl. .................. 719/315; 719/316; 700/214
(58) Field of Classification Search ............... 719/313, 719/314, 315, 316; 700/214
See application file for complete search history.

(56) References Cited

U.S. PATENT DOCUMENTS

| 4,493,021 | A |   | 1/1985  | Agrawal et al. |
|-----------|---|---|---------|----------------|
| 5,457,683 | A |   | 10/1995 | Robins |
| 5,495,479 | A |   | 2/1996  | Galaand et al. |
| 5,511,168 | A |   | 4/1996  | Perlman et al. |
| 5,710,885 | A |   | 1/1998  | Bondi |
| 5,826,032 | A |   | 10/1998 | Finn et al. |
| 5,842,216 | A |   | 11/1998 | Anderson et al. |
| 5,860,020 | A |   | 1/1999  | Van Venrooey et al. |
| 5,978,578 | A |   | 11/1999 | Azarya et al. |
| 5,991,821 | A |   | 11/1999 | Badovinatz et al. |
| 5,996,087 | A |   | 11/1999 | Badovinatz et al. |
| 5,999,517 | A |   | 12/1999 | Koning et al. |
| 6,012,084 | A | * | 1/2000  | Fielding et al. ............. 709/205 |
| 6,026,447 | A |   | 2/2000  | Badovinatz et al. |
| 6,223,217 | B1| * | 4/2001  | Pettus ........................ 709/219 |
| 6,349,352 | B1| * | 2/2002  | Lea ............................ 710/72 |

(Continued)

OTHER PUBLICATIONS

"Microsoft Computer Dictionary," 5th Edition, p. 465.*

(Continued)

*Primary Examiner*—Li B. Zhen
(74) *Attorney, Agent, or Firm*—David W. Victor; Konrad Raynes & Victor LLP (57) ABSTRACT

Provided is a method, system, and program for allowing communication among nodes in a system. A request is received in a source node from a source object executing in the source node to send a message to a destination object executing in a destination node. Each node includes a processor capable of multitasking multiple program objects and a communication interface to transmit and receive data with the other nodes. A determination is made in the source node as to whether the destination node and source node are a same node. The message is sent in the source node to the destination object within the source node if the destination node is the source node. If the destination node is not the source node, then the source node transmits the message to the destination node through the communication interface. The destination node sends the message to the destination object within the destination node.

12 Claims, 7 Drawing Sheets

U.S. PATENT DOCUMENTS 6,614,762 B1    9/2003   Illiadis et al.
6,615,383 B1 *  9/2003   Talluri et al. ............... 714/749
6,850,962 B1 *  2/2005   Povolny et al. ............. 709/203

OTHER PUBLICATIONS

NS Manju Nath, "CAN protocol eases automotive-electronics networking", article from EDN Access For Design, By Design [online], Aug. 17, 1998, [retrieved on Aug. 29, 2001]. Retrieved from the Internet.

Leisa Morello et al., "CAN Bus, Signal Specifications" [online], pp. 1-6, [retrieved on Aug. 29, 2001]. Retrieved from the Internet.

U.S. Appl. No. 09/573,530, Filed on May 19, 2000, entitled, "High Availability Work Queuing in an Automated Data Storage Library", invented by B.G. Goodman and L.G. Jesionowski, including Amendments to Claims dated Aug. 7, 2001.

U.S. Appl. No. 09/573,531, Filed on May 19, 2000, entitled, "Automated Data Storage Library Distributed Control System", invented by Goodman; L.G. Jesionowski; M.P. McIntosh; F. Quintana; C.A. Thompson, Jr.; and R. Yardy, including Amendments to Claims dated Aug. 16, 2001.

"87C196CB Supplement to 8XC196NT User's Manual", Intel Corporation, Oct. 1995.

"82527 Serial Communications Controller Controller Area Network Protocol", Intel Corporation, Dec. 1995, Order No. 272250-006.

"82527 Serial Communications Controller Architectural Overview", Intel Corporation, Jan. 1996, Order No. 272410-003.

"ThreadX the High-Performance Embedded Kernal Use Guide", Express Logic, Inc., Revision 3.0a, 1997.

"OS Open Programmer's Reference", IBM Corporation, Ninth Edition, Feb. 1998.

* cited by examiner

Fig. 1

Prior Art

METHOD, SYSTEM, AND PROGRAM FOR COMMUNICATION AMONG NODES IN A SYSTEM

BACKGROUND OF THE INVENTION

1. Field of the Invention

The present invention relates to a system, method, and program for enabling communication among nodes in a system.

2. Description of the Related Art

Machines or other devices may be comprised of a main controller node that communicates with specific hardware components using a bus interface, such as the Controller Area Network (CAN) serial bus. Each hardware component, e.g., a motor, etc., would include a CAN controller chip to allow communication with the CAN bus and other CAN devices on the bus. A main system controller can transmit commands and data to devices in the system using the CAN message protocol. This arrangement has been satisfactory when there is no need for complex intercomponent communication, such as the case where a main system controller is the primary unit that manages and controls the electro-mechanical devices attached to the CAN bus.

As the complexity of processes that run within the devices and system controller increase and the communication among such processes within the different devices increase, there is a need in the art for improved techniques for implementing the system components and for providing intercommunication among the processes executing within the system components.

SUMMARY OF THE PREFERRED EMBODIMENTS

Provided is a method, system, and program for allowing communication among nodes in a system. A request is received in a source node from a source object executing in the source node to send a message to a destination object executing in a destination node. Each node includes a processor capable of multitasking multiple program objects and a communication interface to transmit and receive data with the other nodes. A determination is made in the source node as to whether the destination node and source node are a same node. The message is sent in the source node to the destination object within the source node if the destination node is the source node. If the destination node is not the source node, then the source node transmits the message to the destination node through the communication interface. The destination node sends the message to the destination object within the destination node.

In further embodiments, there is a message queue associated with each object in each node. Sending the message to the destination object comprises invoking an operating system command to transmit the message to the message queue associated with the destination object.

In still further embodiments, transmitting the message to the destination node comprises determining an address of the destination node that addresses the destination node when transmitting messages through the transmission medium. At least one message packet is generated including the message, the destination node address, and an address of the destination object, and the at least one message packet is transmitted to the destination node.

Still further, each node may be associated with one component of a system. In such case, a first node comprises a controller node, a second node comprises a component node that controls an electro-mechanical component of the system, the source object comprises a work management object that manages system commands and the message includes a command to instruct a motion object in the component node to control the electro-mechanical component to perform an operation.

Yet further, each object may be assigned a unique identifier in the system, wherein the unique identifier is used within all nodes to identify the destination object to receive the message. Each node may also be assigned a unique node identifier used within all nodes to identify the destination node to receive the message.

In still further embodiments, a function call may receive the request from the source object to send the message to the destination object, determine whether the destination node is the same node, and then send the message to the destination object or cause the transmittal of the message to the destination node. The function call maintains the object and node identifier assignment. In such cases, the node and object identifier used by each function call in each node may be updated to reflect a later modification to the arrangement of nodes or objects in the system.

The described implementations provide an improved system to enable program objects to communicate with other objects in a system comprised of multiple nodes. The system may include nodes that control particular electro-mechanical components of the system. A source object would send a message to a destination object, and the routing of the message to a local queue for the destination object or to another node is seamlessly handled by a function call available at each node. In this way, the source object does not have to be concerned about the location of the destination object as the routing of the message to the destination object is handled by a function call.

Moreover, in certain implementations, the function call uses a unique identifier for each node and object throughout the whole system when determining how to route a message to a destination object. In such embodiments, any modification to the arrangement of objects and nodes can be easily updated by merely updating the unique object and node address assignment used by the function calls in each node.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

The Nodal Tape Library System

Figure 1:
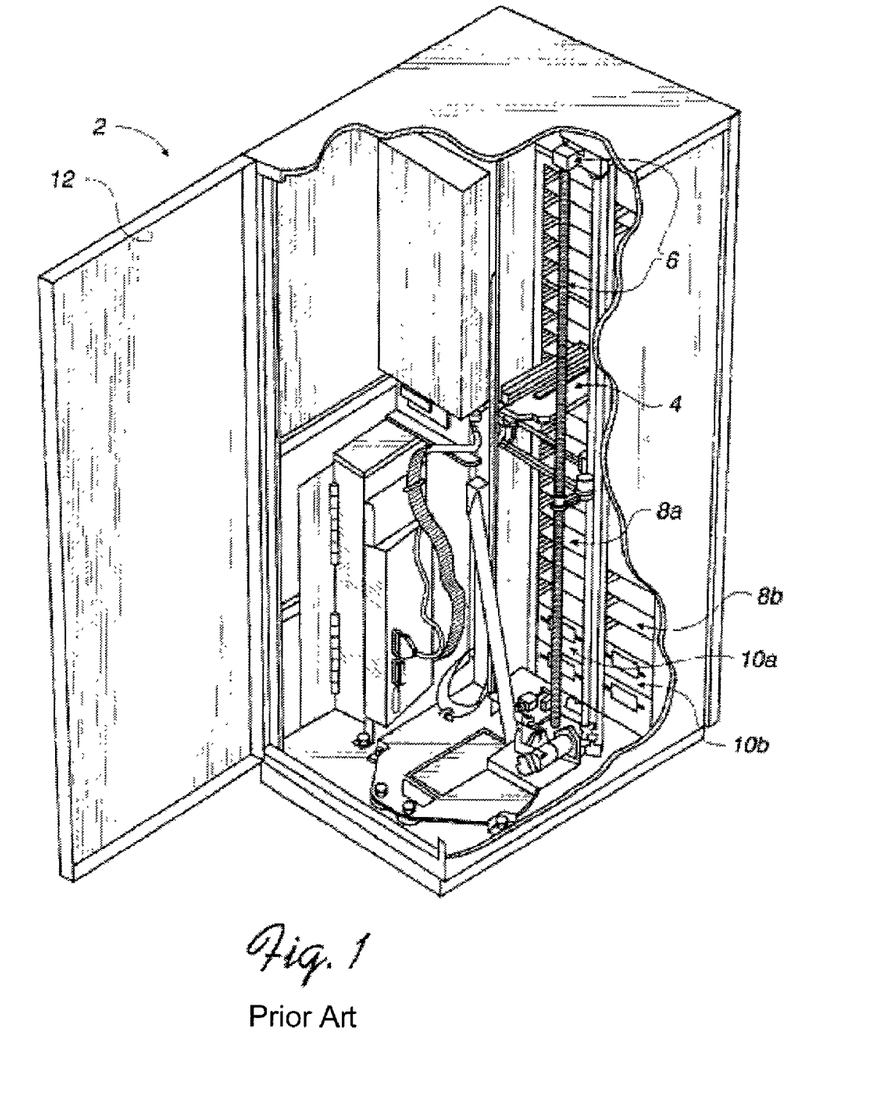
FIG. 1 is a block diagram illustrating of components in a tape library system known in the art.

In certain cases, the node system is implemented in a storage library system that may include certain of the storage library components shown in FIG. 1. Such storage library components may include an array of storage cells, i.e., storage slots, that hold storage cartridges, such as optical or magnetic discs that are portable and removable from the library. The term "storage cartridge" as used herein refers to any structure for housing such removable information media known in the art. With reference to FIG. 1, the storage library 2 includes a controller, an input/output station, a gripper assembly 4 capable of picking up and inserting storage cartridges and an XY system 6 to move the gripper assembly 4 along the XY axis to a desired library element, such as storage slots 8a, b or drives 10a, b. Data operations are performed when the storage cartridge is inserted in the drives 10a, b. Once inserted in the drive 10a, b, data can be read from the cartridge by a host processor. Data transmitted from the host processor can be written to the storage cartridge inserted in the drive 10a, b. The library controller includes a processor, random access memory (RAM), and other controls and interfaces to direct the actions of the library components. The controller further interacts with a system to respond to library commands transmitted from the system. The input/output station is the opening through which the user may insert or remove a cartridge. An operator panel on the outside of the box 2 housing the tape library allows the user to communicate with the library controller. The library 2 also includes an access door 12 through which the user may add or remove cartridges maintained in the storage cells 8a, b.

The term "library element" as used herein refers to any location in the library 2 at which a storage cartridge may be located, e.g., the input/output stations, the storage cells 8a, b, the drives 10a, b, and gripper 4.

The gripper assembly 4 may also be equipped with a machine vision system, such as a bar code reader, to read a label on the storage cartridge when the gripper assembly 4 is positioned near another library element.

Figure 2:
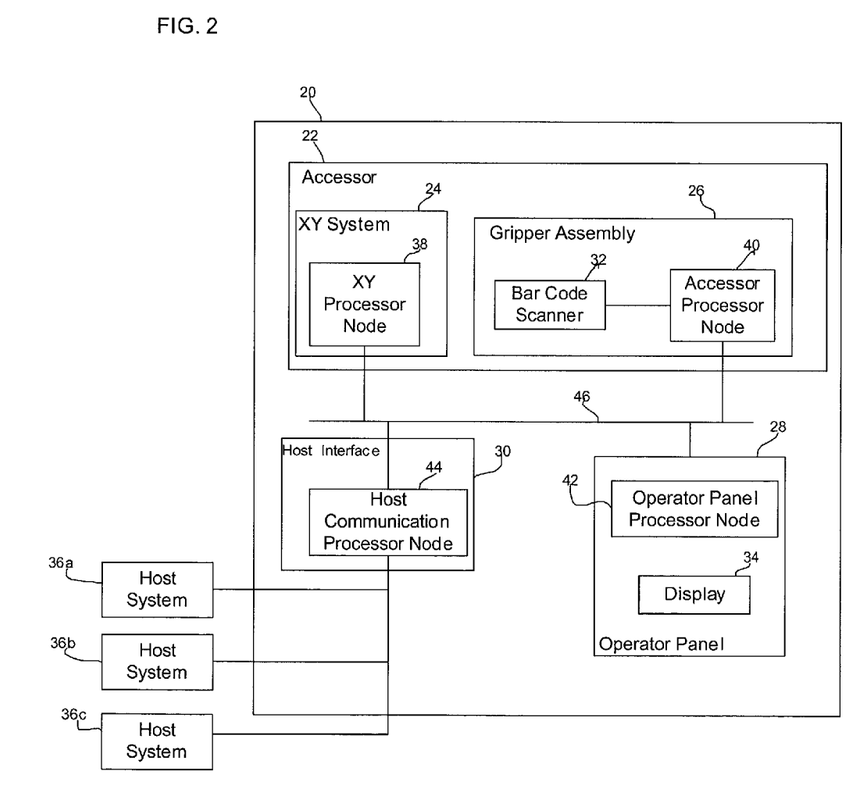
FIG. 2 illustrates an architecture of processor nodes in a storage library system in accordance with preferred embodiments of the present invention.

FIG. 2 illustrates an implementation of a nodal system within a storage library 20. The storage library 20 includes an accessor 22, which includes an XY system 24 and gripper assembly 26, an operator panel 28, and a host interface 30. The XY system 24 includes servo-electronics to move the gripper assembly 26 in the horizontal "X" and vertical "Y" directions to position the gripper assembly 26, which includes a robotic hand or picker as shown as element 4 in FIG. 1, to an appropriate storage slot or drive, such as the storage slots 8a, b and drives 10a, b shown in FIG. 1. The gripper assembly 26 may remove or insert a storage cartridge from a storage slot or drive. The gripper assembly 26 further includes a bar code scanner 32 which can read identification labels on the storage cartridges. The operator panel 28 includes a display 34 to provide information to an operator and user interface controls to receive operator commands.

The host interface 30 provides an interface to host systems 36a, b, c over a communication line, such as a network, serial interface, Small Computer System Interface (SCSI), etc. Additionally, the host interface 30 may communicate with a separate web server or include an embedded web server to enable communication over a network, e.g., an Intranet, Local Area Network (LAN), the Internet, etc. The host systems 36a, b, c can communicate commands and receive data from the library 20 through the host interface 30. In further embodiments, the host systems 36a, b, c may communicate with the library 20 through data storage drives (not shown).

In preferred embodiments, each of the storage library components 24, 26, 28, and 30 include a processor node, an XY processor node 38, accessor processor node 40, operator panel processor node 42, and host communication processor node 44, respectively. Each processor node 38, 40, 42, and 44 comprises a processor, memory, firmware to control the processor, and a port to allow communication with a bus interface 46 through which the processor nodes communicate. The bus interface 46 may comprise a controller area network (CAN) bus known in the art, which is a multi-drop network, having a standard access protocol and wiring standards. In alternative embodiments, the bus 46 may comprise any bus or communication interface known in the art. Each of the processor nodes 38, 40, 42, and 44 may either recognize a message identifier associated with each message on the bus interface 46, in accordance with the CAN protocol, or may be specifically addressed with each message, for example as is known in the SCSI bus standard.

In CAN embodiments, each node 38,40,42, and 44 would include a CAN controller chip. Each node 38, 40, 42, and 44 would be assigned a unique CAN identifier and groups of nodes may also be assigned a unique identifier to allow messages to be broadcast to multiple nodes. Such CAN identifier may comprise a network address, unique number, etc. The CAN chip in each node 38,40, 42, and 44 would be configured to receive messages including an identifier or address assigned to address the particular node 38, 40, 42, and 44 and transmit messages including an identifier or address assigned to one of the other nodes 38, 40, 42, and 44. Details of programming the CAN chip are described in the publication entitled "82527 Serial Communications Controller Architectural Overview (Automotive)", having Intel order no. 272410-003 (Intel Corporation, January 1996), which publication is incorporated herein by reference in its entirety.

In the described embodiments, the components of the library system 20 function as distributed computing elements, each operating under the control of their respective processor node, which performs system specific operations. In preferred embodiments, the accessor processor node 40 functions as the central processor to receive, queue, execute, or distribute host system 36a, b, c commands. Thus, the accessor processor node 40 provides central processing facilities, including workflow management and queuing. In preferred embodiments, the host communication processor node 44 receives the host system 36a, b, c commands through the port and interface electronics provided by the host interface 30 and transfers the commands to the accessor processor node 40 over the bus 46. The accessor processor node 40 can then execute such commands to control the gripper assembly 26 servo electronics to move the gripper assembly, or transfer XY motion commands to the XY processor node 38. The XY processor node 38 executes the commands to control the XY system 24 servo-electronics to move the accessor 22 in an XY direction through the tape library 20 to access a storage cartridge in a drive or storage slot. The host system 36a, b, c command can instruct the accessor 22 to read the identification label on the storage cartridge at a particular location, access a storage cartridge at one library element (e.g., drive, storage slot, gripper, I/O slot, etc.) and move the storage cartridge to another library element.

In further embodiments, the library system 20 may include redundant instances of the above components 22, 28, and 30 to improve the availability of the system and increase processing capabilities. The co-pending and commonly assigned patent applications "High Availability Work Queuing in an Automated Data Storage Library", having U.S. application Ser. No. 09/573,530, filed May 19, 2000 and "Automated Data Storage Library Distributed Control System", having U.S. application Ser. No. 09/573,531, filed May 19, 2000, which are both incorporated herein by reference in their entirety, describe further details of a tape library system including distributed processor nodes to implement the components of the tape library system.

Nodal Communication

Figure 3:
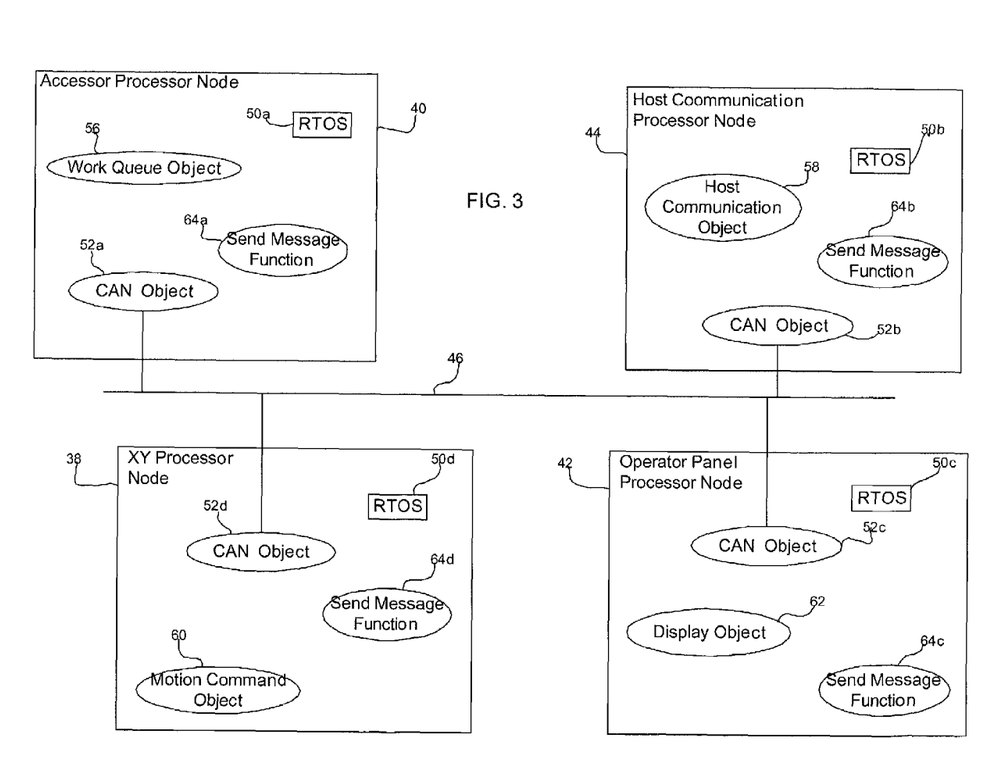
FIG. 3 illustrates objects executing within the nodes in accordance with preferred embodiments of the present invention.

FIG. 3 illustrates further detail of software components that execute within the XY processor node 38, accessor processor node 40, host communication processor node 44, and operator panel processor node 42. Each node 38, 40, 42, and 44 includes a real time operating system (RTOS) 50a, b, c, d, such as the RTOS described in the publication "ThreadX the high-performance embedded kernel: USER GUIDE" (Express Logic, Inc. 1997–1998), which publication is incorporated herein by reference in its entirety. Each node further includes a CAN object 52a, b, c, d which manages message traffic between the node and the bus interface 46. The CAN objects 52a, b, c, d are capable of configuring the CAN chips included within the node.

Each node further includes objects which perform operations unique to that node. For instance, the accessor processor node 40 includes a work queue object 56 that queues and executes tape library commands from the host systems 36a, b, c. The host communication processor node 44 includes a host communication object 58 that manages host system 36a, b, c (FIG. 2) communication and transmits host tape library commands to the work queue object 56 to queue and execute. The XY processor node 38 includes a motion command object 60 that receives motion related commands from the work queue object 56 and executes such commands to control motion servo-electronics to move the accessor in the X-Y directions. Similarly, the accessor processor node 40 may include objects to manipulate the servo-electronics of the gripper assembly 26 (FIG. 2). The operator panel processor node 42 includes a display object 62 that processes display commands from the work queue object 56 and, in response, generates commands to render output on the display 34 (FIG. 2). In this way, the nodes 38, 40, 42, and 44 include a RTOS 50a, b, c, d, which allows code objects to execute and multitask to perform the particular operations of that node.

In preferred embodiments, an object executing in one of the nodes 38, 40, 42, and 44 would call a send message function 64a, b, c, and d to handle the transmission of a message to a local object or an object at a remote node. Thus, the same function call 64a, b, c, d is used to transmit a message to any object, whether it is on local or remote node. In this way, message communication for an object is seamless. In preferred embodiments, each object in each node is assigned a unique identifier, referred to as an object identifier. The send message function 64a, b, c, d includes a global mapping of each object to an object identifier, each node to a node identifier, and each object identifier to a node identifier indicating the node in which the object executes. The unique identifier may comprise a unique address, number, code, etc. Thus, for every object identifier there is an associated node number indicating the node in which the object identified by the object number executes. The same global mapping is used by each send message function 64a, b, c, d in every node 38, 40, 42, 44.

Figure 4:
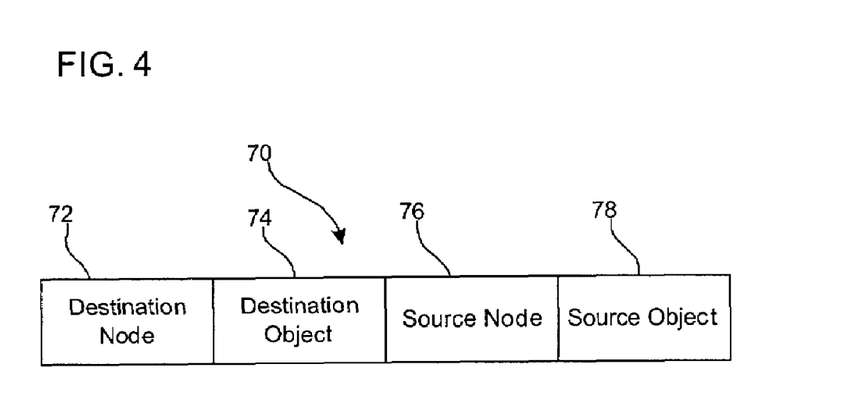
FIG. 4 illustrates fields in a message in accordance with preferred embodiments of the present invention.

FIG. 4 illustrates the format of the fields in a message header 70 that is filled-in by the send message function 64a, b, c, d to transmit a message to another object. The message header 70 includes a destination node 72, destination object 74, source node 76, and source object 78 fields indicating the source and destination objects and nodes for a message.

In preferred embodiments, the CAN objects 52a, b, c, d are capable of transmitting messages to nodes on the interface 46 using a standard network transmission protocol, such as Transmission Control Protocol/Internet Protocol (TCP/IP), Ethernet protocols, proprietary communication protocols, etc. to communicate over a CAN interface 46. The CAN objects 52a, b, c, d would include the capability to determine the CAN message addresses that correspond to the destination node 72 specified in the message header 70. The CAN message address is used to address the nodes on the CAN bus 46. The source object can specify a group of destination objects. In such case, the destination node field 72 can specify all or a group of nodes that include the destination objects. The CAN object would then select a CAN message address that addresses all the destination nodes specified in field 72 of the message 70. The send message function 64a, b, c, d fills in the fields of the message header 70.

Figure 5:
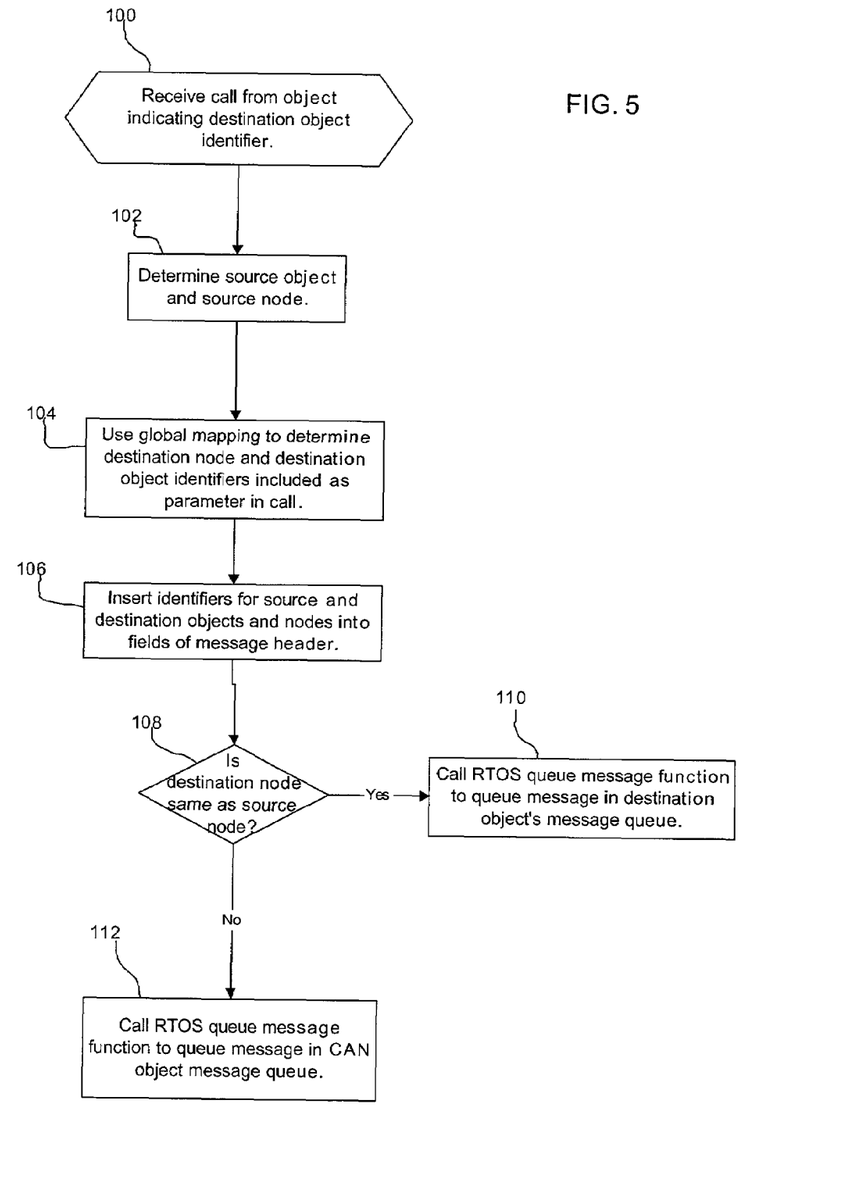
FIG. 5 illustrates logic implemented in a send message function call to transmit messages between object in accordance with preferred embodiments of the present invention.

FIG. 5 illustrates the logic implemented in the send message function 64a, b, c, d to transmit messages from one object to another. At block 100, the send message function 64a, b, c, d is called by one of the objects 56, 58, 60, 62 with a message to send to one other object with a parameter including the destination object identifier 74 In response, the send message function 64a, b, c, d determines (at block 102) the source object that invoked the call and the source node from which the call was made. The send message function 64a, b, c, d may obtain such source node and object identifier information from the message transmission or use operating system commands to determine the source object and node from which the message was invoked. The send message function 64a, b, c, d then determines from the global mapping (at block 104) the destination node that includes the destination object identifier provided in the parameter of the call to the send message function 64a, b, c, d. The send message function 64a, b, c, d then inserts (at block 106) the determined identifier information in the fields 72, 74, 76, and 78 of the message header 70. If (at block 108) the destination node 72 is the same as the source node 76, then the send message function 64a, b, c, d calls (at block 110) the RTOS queue send function to queue the message in the message queue of the destination object. In the ThreadX RTOS, the function to send a message to a message queue is the tx_queue_send function. In preferred embodiments, there is one message queue assigned to each object. In further embodiments, multiple objects may share one or more message queues, or multiple message queues may be assigned to one object. Otherwise, if (at block 108) the destination node is remote, then the send message function 64a, b, c, d calls (at block 112) the RTOS queue send function to queue the message with header 70 in the CAN object 52a, b, c, d message queue.

Figure 6:
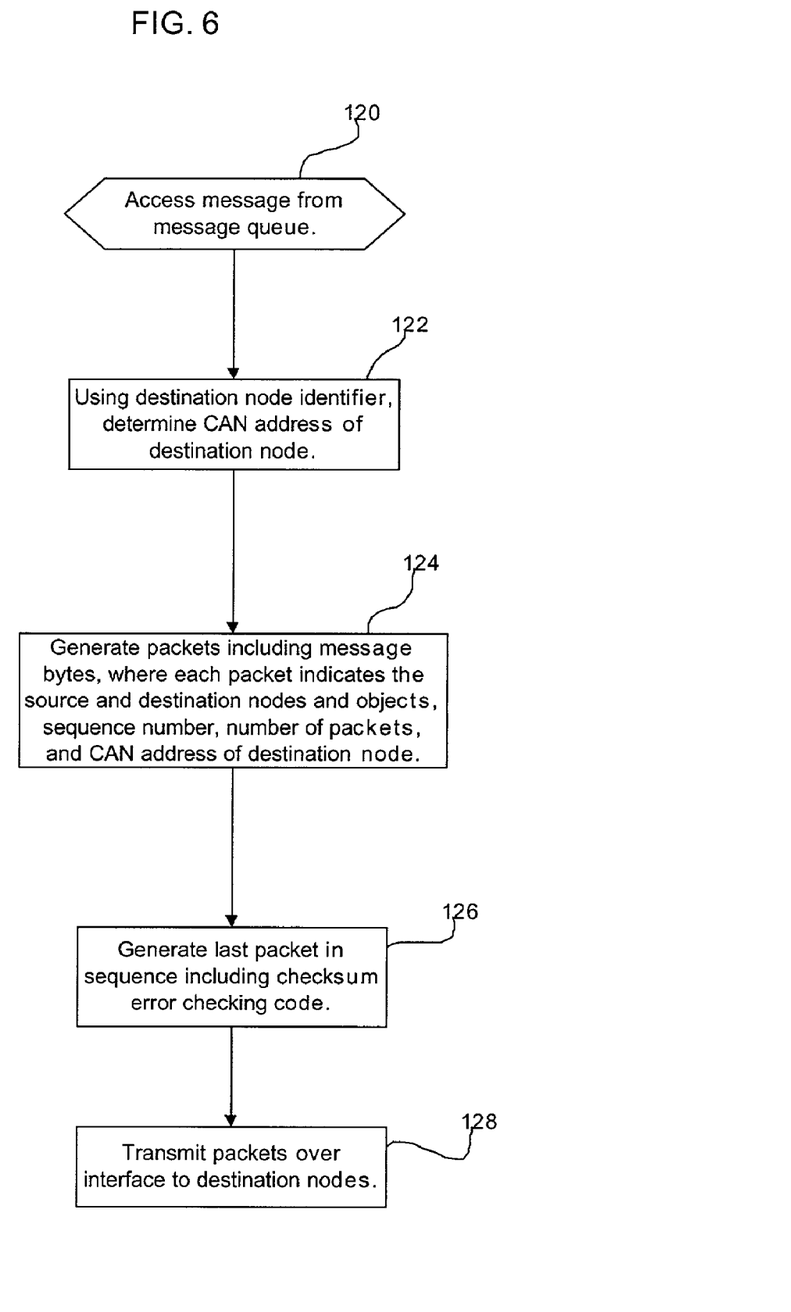
FIG. 6 illustrates logic to transmit a message across a transmission medium in accordance with preferred embodiments of the present invention.

FIG. 6 illustrates logic implemented in the CAN objects 52a, b, c, d to process messages queued in their message queue. Control begins at block 120 with the CAN object 52a, b, c, d access a message in the message queue. In preferred embodiments, the CAN objects 52a, b, c, d would maintain a mapping of node identifiers to CAN addresses that address the nodes on the bus interface 46. At block 122, the CAN object 52a, b, c, d determines the CAN address of the destination node(s) indicated in field 72. The CAN object 52a, b, c, d then generates (at block 124) message packets including the message header 70, a sequence number of the packets, the total number of packets, and the determined CAN address of the destination node. The CAN chips on the nodes 38, 40, 42, 44 determine whether they should read a message transmitted on the bus interface 46. In preferred embodiments, the CAN objects 52a, b, c, d divide a message into multiple packets for transmittal. In alternative embodiments, the CAN object 52a, b, c, d may generate a single message packet. At block 126, the CAN object 52a, b, c, d generates a last packet in the sequence including a checksum on the contents of all the previous packets for error checking purposes. The message packets are then transmitted (at block 128) to the bus 46.

Figure 7:
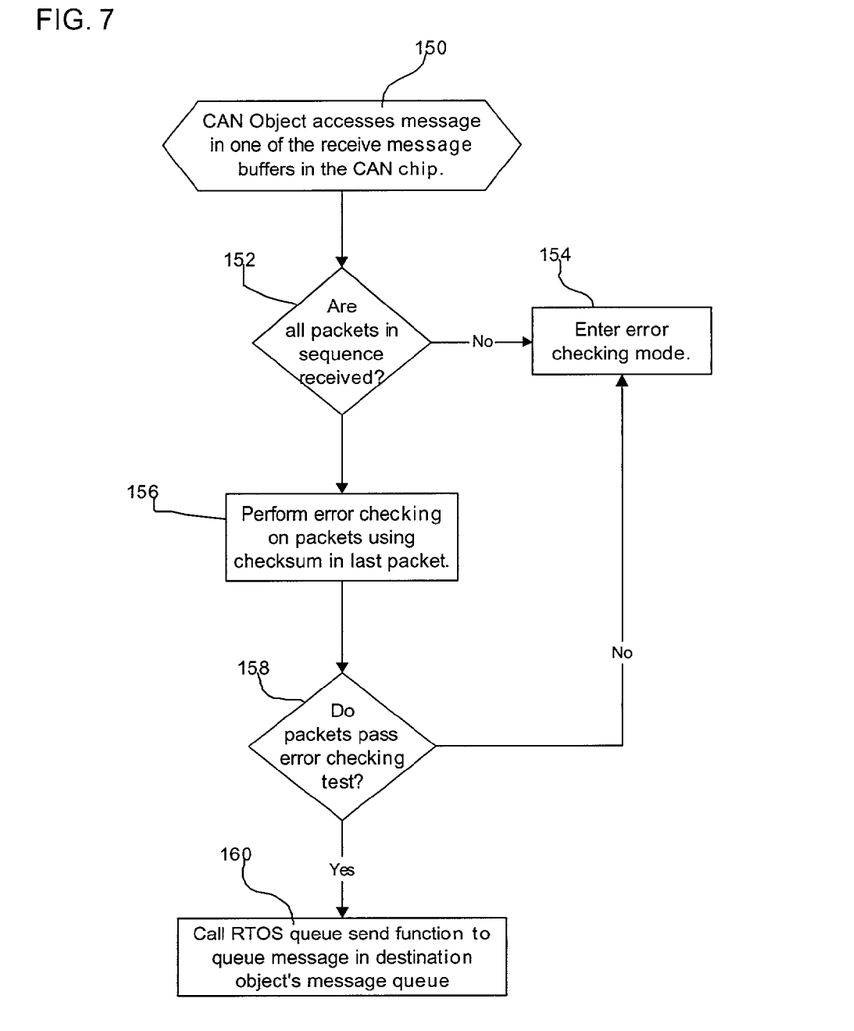
FIG. 7 illustrates logic to send a message received over the transmission medium to the destination object in accordance with preferred embodiments of the present invention.

FIG. 7 illustrates logic implemented in the CAN objects 52a, b, c, d to handle the receipt of message transmitted over the bus 46. At block 150, the CAN object 52a, b, c, d accesses a message in one of the receive message buffers maintained in the CAN chip for the node. As discussed, the CAN chip for one of the nodes 38, 40, 44 would compare the CAN address in a message transmitted on the bus 46 with the addresses associated with receive message buffers in the CAN chip to determine whether the message on the bus 46 is addressed to that node 38, 40, 42, 44. If the message is addressed to that node 38, 40, 42, 44, then the CAN chip stores the message in the receive message buffer. Upon receipt of the last packet or after a timeout period, the CAN object 52a, b, c, d would then determine (at block 152) if all the packets in a sequence of packets for a message were received in the CAN chip. If not, then the CAN object 52a, b, c, d enters (at block 154) an error mode to recover the missing packets. Otherwise, if all packets were received, the CAN object 52a, b, c, d performs (at block 156) an error checking operation on the packet using the checksum in the last packet to determine if the message data has been corrupted during transmission on the bus 46. If (at block 158) the packets do not pass the error checking test, then the CAN object 52a, b, c, d enters (at block 154) the error checking mode to request that the message be resent or some other error recovery action. If the packets pass error checking, then the CAN object 52a, b, c, d calls (at block 160) the RTOS queue message function to queue the message in the destination object message queue indicated in the destination object 74 field of the message header 70 included in the message.

In further embodiments, the CAN objects 52a, b, c, d on each node 38, 40, 42, and 44 can transmit messages or pings to determine the availability of the other nodes and determine the immediate status on the connection to the destination object. In this way, the send message function 64a, b, c, d can be assured that the destination node is available when transmitting messages through the CAN objects 52a, b, c, d.

Preferred embodiments provide a technique for allowing objects in a distributed computing environment in a system to communicate seamlessly using a single send message function. This single send message function determines whether to route the message to a local object message queue using a standard RTOS queue send function. If the object is not local, then the preferred embodiment send message function sends the message to an object to handle the transmission of the message over the bus interface.

With the preferred embodiments, if the arrangement of objects is altered, then all that has to be updated is the global mapping used by each send message function call. The updated global mapping indicates a new assignment of object identifiers to objects and association of object identifiers to nodes. For instance, if objects from one or more nodes are later consolidated into fewer nodes, then only the global mapping indicating the assignment of objects to nodes would have to be updated in each node to allow the send message function call to use the new arrangement. Further, the removal or addition of nodes and objects can readily be indicated by updating the global mapping to reflect the new arrangement of nodes and objects.

Further, in preferred embodiments, each of the nodes functions independently of the other. This arrangement is different than many CAN systems where there is a master controller and various slaves devices connected to the CAN bus. With the preferred embodiments, each node is an independent processing unit and the preferred embodiments provide a communication interface to allow processes and objects executing independently on the nodes to seamlessly communicate with objects executing in the same or different nodes in the systems.

Following are some alternative implementations for the preferred embodiments. The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In preferred embodiments, the processor nodes comprised processors that operated under firmware control. In alternative embodiments, the processor nodes may be implemented as hardware logic, such as logic on an integrated circuit chip, e.g., an ASIC, FPGA, etc.

In preferred embodiments, a CAN object is used to generate a message compatible with the CAN protocol to transmit over a CAN bus, using a CAN messaging protocol and CAN chip. In this way, the CAN object provides the interface between the node and the CAN chip. In alternative embodiments, the bus interface may comprise any bus interface known in the art, e.g., Ethernet, LAN etc., and the CAN object may comprise a network object to transmit the message using a network transmission protocol, e.g., TCP/IP, user datagram protocol (UDP), etc., other than CAN. In still further embodiments, the nodes may communicate using any transmission medium known in the art, including a wireless transmission medium. In such alternative embodiments, each node would include hardware to enable communication through the transmission medium according to a communication system and protocol known in the art.

The preferred logic of FIGS. 5–7 describe specific operations occurring in a particular order. In alternative embodiments, certain of the logic operations may be performed in a different order, modified or removed and still implement preferred embodiments of the present invention. Moreover, steps may be added to the above described logic and still conform to the preferred embodiments.

In preferred embodiments, the nodes were used to implement the components of a tape library system. In alternative embodiments, the nodes may be part of any system or machine known in the art, where the components of the machine or system may be implemented as distributed processing nodes that communicate over a bus interface.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method for allowing communication among processing nodes in a system, comprising:
   receiving, with a host communication object executing in a communication node, a command from a host system to instruct a motion object executing in a component node to control an electro-mechanical component of the system to perform an operation, wherein the component node controls the electro-mechanical component of the system;
   generating, with the host communication object, a message, including the command to instruct the motion object, to send to a work management object executing in a controller node, wherein the controller node manages system commands;
   multitasking, by the communication, controller and component nodes, multiple program objects;
   transmitting and receiving data via a communication interface, by the communication, controller and component nodes, with the other nodes, wherein each node is associated with one component of the system; and
   operating, by the communication, controller and component nodes, as a source node receiving a request from a source object in the source node to send a message to a destination object executing in a destination node by:
      receiving a request from the source object executing in the source node to send a message to the destination object executing in the destination node;
      determining whether the destination node and source node are a same node;
      invoking an operating system command to transmit the message to the destination object within the source node if the destination node is the source node; and
      if the destination node is not the source node, then transmitting the message to the destination node through the communication interface; and
   operating, by the communication, controller and component nodes, as the destination node by invoking an operating system command in the destination node to transmit the message received from the source node to the destination object within the destination node.

2. The method of claim 1, wherein there is a message queue associated with each object in each node, and wherein the invoked operating system command in the source node transmits the message to the message queue associated with the destination object.

3. The method of claim 1, wherein transmitting, with the source node, the message to the destination node over the communication interface, comprises:
   determining, in the source node, an address of the destination node that addresses the destination node when transmitting messages through the communication interface;
   generating, in the source node, at least one message packet including the message, the determined address, and an address of the destination object; and
   transmitting, with the source node, the at least one message packet to the destination node over the communication interface.

4. The method of claim 3, wherein the communication interface comprises a bus and wherein including the address of the destination node in the message causes the destination node to read the at least one message packet transmitted on the bus.

5. The method of claim 2, wherein sending the message to the destination object in the destination node comprises:
   determining, in the destination node, the destination object for at least one message packet including the message;
   extracting, in the destination node, the message from the message packet, wherein the invoked operating system command in the destination node transmits the message to the message queue associated with the destination object.

6. The method of claim 1, wherein transmitting, with the source node, the message to the destination node comprises:
   invoking an operating system command, with the source object, to send the message to a message queue associated with a source network object in the source node;
   determining, with the source network object, an address of the destination node that addresses the destination node when transmitting messages through the communication interface;
   generating, with the source network object, at least one message packet including the message, the determined address of the destination node, and an address of the destination object;
   transmitting, with the source network object, the at least one message packet to the destination node over the communication interface; and
   receiving, with a destination network object, the at least one message packet, wherein the destination network object invokes the operating system command in the destination node to transmit the message to a message queue associated with the destination object in the destination node.

7. The method of claim 6, wherein routing the message, with the destination network object in the destination node, to the destination object comprises:
   determining the destination object for the at least one message packet;
   extracting the message from the message packet, wherein the operating system command is invoked to transmit the message to the message queue associated with the destination object.

8. The method of claim 1, wherein the system comprises a storage library system, and the electro-mechanical component comprises a component of a storage library system.

9. The method of claim 1, wherein each object is assigned a unique object identifier in the system, and wherein the unique identifier is used within all nodes to identify the destination object to receive the message.

10. The method of claim 9, wherein each node is assigned a unique node identifier used within all nodes to identify the destination node to receive the message.

11. The method of claim 10, wherein a function call receives the request from the source object to send the message to the destination object, determines whether the destination node is the same node, sends the message to the destination object or causes the transmittal of the message to the destination node over the communication interface, and maintains the object and node identifier assignment, further comprising:
   updating the node and object identifier used by each function call in each node to reflect a modification to the arrangement of nodes or objects in the system.

12. The method of claim 1, wherein each node transmits signals to determine an availability of other nodes on the communication interface.

* * * * *